(12) United States Patent
Ryu et al.

(10) Patent No.: US 10,306,581 B2
(45) Date of Patent: May 28, 2019

(54) METHOD AND DEVICE FOR TRANSMITTING OR RECEIVING LOCATION INFORMATION

(71) Applicants: Samsung Electronics Co., Ltd., Suwon-si, Gyeonggi-do (KR); RESEARCH & BUSINESS FOUNDATION SUNGKYUNKWAN UNIVERSITY, Suwon-si, Gyeonggi-do (KR)

(72) Inventors: Hyunseok Ryu, Yongin-si (KR); Sang-Hyo Kim, Seoul (KR); Jong-Hwan Kim, Suwon-si (KR); Seung-Hoon Park, Seoul (KR); Peng Xue, Suwon-si (KR); Kyung-Min Lee, Suwon-si (KR); Min Jang, Seoul (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/578,052

(22) PCT Filed: Jun. 8, 2016

(86) PCT No.: PCT/KR2016/006017
§ 371 (c)(1),
(2) Date: Nov. 29, 2017

(87) PCT Pub. No.: WO2016/200121
PCT Pub. Date: Dec. 15, 2016

(65) Prior Publication Data
US 2018/0152910 A1    May 31, 2018

(30) Foreign Application Priority Data
Jun. 9, 2015   (KR) .................... 10-2015-0081413

(51) Int. Cl.
*H04W 24/00* (2009.01)
*H04W 64/00* (2009.01)
(Continued)

(52) U.S. Cl.
CPC .......... *H04W 64/00* (2013.01); *G01S 5/0027* (2013.01); *G01S 5/0072* (2013.01); *G01S 5/02* (2013.01); *G01S 11/16* (2013.01); *H04W 28/06* (2013.01)

(58) Field of Classification Search
CPC .......... G01S 11/16; G01S 5/02; G01S 5/0063; H04W 28/06; H04W 64/00; H04W 24/00;
(Continued)

(56) References Cited

U.S. PATENT DOCUMENTS 8,200,251 B2 *  6/2012  Huang ............... G06F 17/3087
                                                        455/404.2
8,750,894 B1 *  6/2014  Stogaitis ................. H04W 4/02
                                                        370/325
(Continued)

FOREIGN PATENT DOCUMENTS

KR   10-2005-0027835 A    3/2005
KR   10-2005-0089449 A    9/2005
(Continued)

OTHER PUBLICATIONS

Kamel et al., Simple Model for Coding Geographic Location Coordinates, International Journal of Scientific & Engineering Research, Jul. 2013, vol. 4, Issue 7.

*Primary Examiner* — Nathan S Taylor
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A reception
(Continued)

method for an electronic device of the present disclosure comprises the steps of: receiving, from a transmission device, first location information including information on the coverage area of the transmission device; generating second location information using the first location information and location information of the electronic device; and determining location information of the transmission device using the second location information and information on the coverage area of the electronic device.

15 Claims, 15 Drawing Sheets

(51) Int. Cl.
*G01S 5/02* (2010.01)
*G01S 11/16* (2006.01)
*H04W 28/06* (2009.01)
*G01S 5/00* (2006.01)

(58) Field of Classification Search
CPC ......... H04W 24/10; H04W 4/02; H04W 4/18; H04W 56/001; H04W 56/0045; H04W 74/08; H04W 80/04; H04W 88/08
See application file for complete search history.

(56) References Cited

U.S. PATENT DOCUMENTS

| 2007/0247367 | A1* | 10/2007 | Anjum | ................. | H04W 64/00 |
| | | | | | 342/464 |
| 2008/0032705 | A1* | 2/2008 | Patel | ..................... | H04W 4/18 |
| | | | | | 455/456.1 |
| 2010/0085249 | A1 | 4/2010 | Ferguson et al. | | |
| 2012/0062415 | A1 | 3/2012 | Hwang et al. | | |
| 2012/0182180 | A1* | 7/2012 | Wolf | ..................... | G01S 5/021 |
| | | | | | 342/357.29 |
| 2014/0044108 | A1* | 2/2014 | Earnshaw | ............. | G01S 5/0063 |
| | | | | | 370/336 |
| 2014/0171105 | A1* | 6/2014 | Al-Mufti | ............... | G01S 5/0221 |
| | | | | | 455/456.1 |
| 2014/0248906 | A1* | 9/2014 | Wigren | ................. | H04W 64/00 |
| | | | | | 455/456.1 |
| 2016/0234645 | A1* | 8/2016 | Belghoul | ................. | G01O 5/06 |
| 2018/0048854 | A1* | 2/2018 | Kwak | ................... | H04L 1/0041 |
| 2018/0152910 | A1* | 5/2018 | Ryu | ........................ | G01S 5/02 |

FOREIGN PATENT DOCUMENTS

| KR | 10-0521059 B1 | 10/2005 |
| KR | 10-2008-0107890 A | 12/2008 |
| KR | 10-1179701 B1 | 9/2012 |

* cited by examiner

METHOD AND DEVICE FOR TRANSMITTING OR RECEIVING LOCATION INFORMATION

CROSS-REFERENCE TO RELATED APPLICATIONS

This application is a U.S. National Stage application under 35 U.S.C. § 371 of an International application filed on Jun. 8, 2016 and assigned application number PCT/KR2016/006017, which claimed the benefit of a Korean patent application filed on Jun. 9, 2015 in the Korean Intellectual Property Office and assigned Serial number 10-2015-0081413, the entire disclosures of each are hereby incorporated by reference.

TECHNICAL FIELD

The present invention relates to transmission/reception of location information.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Location information of a communication entity that can be acquired through technology such as a Global Positioning System (GPS) may be used for various services including "navigation" and "neighboring area information provision service". Furthermore, if not only its own location information but also location information of other communication entities can be used, it is expected that various derivative application technologies will be developed in the future. For example, when a terminal located within a shop provides a service of transmitting and broadcasting its own location information for advertising or marketing or the terminal desires to know location information of any other terminal through positioning technology, location information of the corresponding terminal may be used as auxiliary information.

However, in order to transmit the location information to another communication entity, the use of communication resources is necessary. When GPS location information is transmitted, communication resources required for the transmission of about 64 bits are used. Particularly, transmission of the location information to another communication entity may cause an increase in the amount of traffic, which must not be ignored in consideration of the recent trend toward IoT-oriented technology. Further, in the case in which location information is included in a search signal of M2M communication, transmission of location information of 64 bits may be relatively large overhead. Accordingly, a method of transmitting location information with reduced overhead is needed.

DETAILED DESCRIPTION OF THE INVENTION

Technical Problem

An embodiment of the present invention provides an apparatus and a method for transmitting/receiving location information having reduced overhead.

Another embodiment of the present invention provides an apparatus and a method for receiving partial location information transmitted from a transmission device and reconstructing the original location information of the transmission device.

Solution to Problem

In accordance with an aspect of the present invention, a method of performing reception by an electronic device is provided. The method includes: receiving, from the transmission device, first location information including information on a range within which a transmission device can communicate; generating second location information based on the first location information and location information of the electronic device; and determining location information of the transmission device based on the second location information and information on a range within which the electronic device can communicate.

In accordance with another aspect of the present invention, an electronic device is provided. The electronic device includes: a transceiver configured to communicate with a transmission device; and a controller functionally connected to the transceiver, wherein the controller receives first location information including information on a range within which the transmission device can communicate from the transmission device, generates second location information based on the first location information and location information of the electronic device, and determines location information of the transmission device based on the second location information and information on a range within which the electronic device can communicate.

In accordance with another aspect of the present invention, a method of performing transmission by an electronic device is provided. The method includes: identifying location information of the electronic device; and transmitting some pieces of lower information included in the location information to a reception device, wherein some pieces of the lower information include information on a range within which the electronic device can communicate.

In accordance with another aspect of the present invention, an electronic device is provided. The electronic device includes: a transceiver configured to communicate with a transmission device; and a controller functionally connected to the transceiver, wherein the controller identifies location information of the electronic device and transmits some pieces of lower information included in the location information to a reception device, the some pieces of the lower information including information on a range within which the electronic device can communicate.

Advantageous Effects of Invention

According to an embodiment of the present invention, there is an effect of identifying the location of a device that transmits location information based on only some pieces of the location information and reducing overhead by changing only some pieces of the location information.

BEST MODE FOR CARRYING OUT THE INVENTION

Hereinafter, exemplary embodiments of the present invention will be described in detail with reference to the accompanying drawings. Further, in the following description of the present invention, a detailed description of known functions and configurations incorporated herein will be omitted when it may make the subject matter of the present invention rather unclear.

Hereinafter, the present invention describes technology for controlling location information. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a MP3 player, a mobile medical device, a camera, a wearable device (e.g., head-mounted-device (HMD) such as electronic glasses, electronic clothes, an electronic bracelet, an electronic necklace, an electronic appcessory, an electronic tattoo, or a smart watch).

Figure 1:
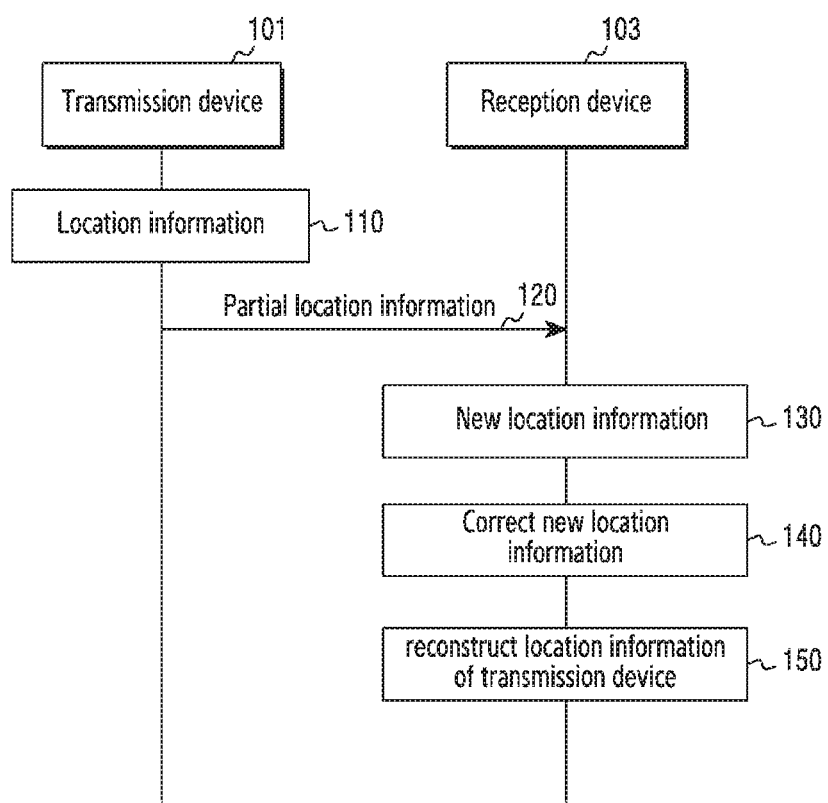
FIG. 1 is a flowchart illustrating a process of exchanging location information between a transmission device and a reception device according to an embodiment of the present invention.

FIG. 1 is a flowchart illustrating a process of exchanging location information between a transmission device and a reception device according to an embodiment of the present invention.

Referring to FIG. 1, a transmission device 101 acquires current location information 110 of the transmission device 101. The location information 110 may consist of a plurality of bits. Since transmission of all of the plurality of bits may cause an increase in overhead, the transmission device 101 according to an embodiment of the present invention may transmit partial location information 120 of the location information 110. The partial location information 120 may have the size corresponding to a radius within which the transmission device 101 can communicate. Further, the radius may correspond to the strength of a signal with which the transmission device 101 communicates.

According to an embodiment of the present invention, a reception device 103 receiving the partial location information 120 from the transmission device 101 may reconstruct the location information 110 of the transmission device 101 based on the partial location information 120. In order to reconstruct the location information 110 of the transmission device 101, the reception device 103 may generate new location information 130 by replacing some pieces of current location information of the reception device 103 with the received partial location information 120. The reception device 103 may identify whether the generated new location information 130 is a value corresponding to the radius of the reception device 103, and, when the new location information 130 is not a value corresponding to the radius thereof, perform new location information correction 140. Through the new location information correction 140, the reception device 103 may reconstruct 150 the location information 110 of the transmission device 101.

Figure 2A:
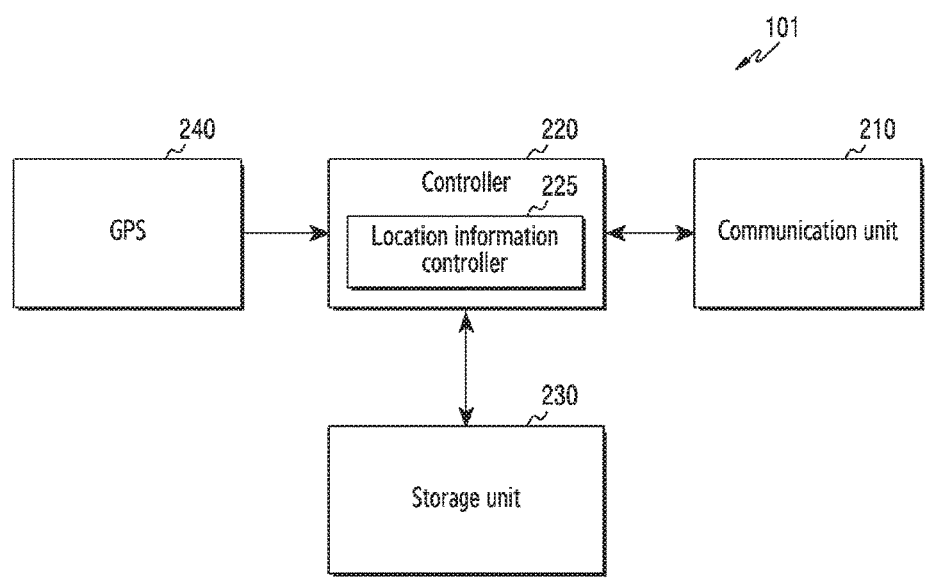
FIG. 2A is a block diagram illustrating a transmission device for controlling location information according to an embodiment of the present invention.

FIG. 2A is a block diagram illustrating the transmission device 101 for controlling location information according to an embodiment of the present invention.

Referring to FIG. 2A, the transmission device 101 includes a communication unit 210, a controller 220, a storage unit 230, and a Global Positioning System (GPS) receiver 240.

The communication unit 210 performs a function for transmitting and receiving a signal through a wireless channel, such as band conversion and amplification of a signal. For example, the communication unit 210 may include a transmission filter, a reception filter, an amplifier, a mixer, an oscillator, a Digital-to-Analog Converter (DAC), an Analog-to-Digital Converter (ADC), and the like. The communication unit 210 according to an embodiment of the present invention may transmit and receive location information. Particularly, the communication unit 210 according to an embodiment of the present invention may transmit partial location information. The communication unit 210 may be referred to as a transmitter, a receiver, a transceiver, or a communication unit.

The controller 220 controls the overall operation of a device for controlling location information. The controller 220 includes a location information controller 225. The location information controller 225 controls, for example, the device for controlling the location information to perform a procedure illustrated in FIG. 2B. According to an embodiment of the present invention, the operation of the controller 220 is described below.

The controller 220 generates partial location information of the location information. The controller 220 may generate only the partial location information among current location information of the electronic device. The partial location information may have a size corresponding to a radius value of the electronic device. According to an embodiment, the radius value may correspond to the strength of a signal with which the electronic device communicates.

The storage unit 230 may store values required by the device for controlling the location information. According to an embodiment of the present invention, the storage unit 230 may store location information acquired from the GPS receiver 240.

The GPS receiver 240 may receive location information.

Figure 2B:
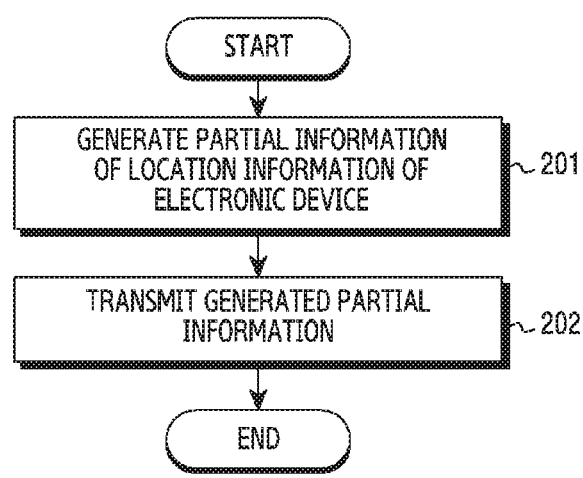
FIG. 2B is a flowchart illustrating the operation of a transmission device for controlling location information according to an embodiment of the present invention.

FIG. 2B is a flowchart illustrating the operation of the transmission device 101 for controlling location information according to an embodiment of the present invention.

Referring to FIG. 2B, the transmission device 101 for controlling location information generates partial location information among the location information of the transmission device 101 in step 201. According to an embodiment of the present invention, the transmission device 101 may transmit only some pieces of the location information to another electronic device.

The transmission device 101 may transmit some pieces of the location information to an unspecified electronic device, or may identify that there are electronic devices within a preset range and transmit some pieces of the location information only to the electronic devices within the preset range.

The transmission device 101 may acquire location information through a GPS, Wi-Fi, or cellular network. The transmission device 101 may acquire location information based on acquired latitude and longitude.

In general, when a transmission entity transmits its own accurate location information to another communication entity, the transmission entity should transmit all pieces of location information. For example, when GPS location information is transmitted, all latitude and longitude information, expressed in about 64 bits, should be transmitted. When transmitting all pieces of the acquired location information without any change, the transmission device 101 may waste resources due to overhead attributable to information transmission.

According to an embodiment of the present invention, the location information may be expressed by the number of bits. In order to transmit only some pieces of the location information, the transmission device 101 may transmit only some bits of the location information expressed by the number of bits according to a preset reference. According to an embodiment of the present invention, the preset reference may be determined in accordance with a communication radius. The communication radius may be set in consideration of the strength of a signal which the transmission device 101 can transmit in a system in which the transmission device 101 operates. Further, the communication radius may be set in consideration of a predetermined margin of the considered signal strength.

In the present invention, the case in which the communication radius is 500 m will be described as an example for convenience of description. When the communication radius is 500 m, a difference value of the longitude for the communication radius based on the latitude of 40 degrees is about 0.005000°. The communication radius is calculated based only on one direction. When both directions of the transmission device 101 are considered, the distance from one end to the other end of the communication radius is 1000 m. Accordingly, in the communication radius of 1000 m, a difference value of the longitude based on the latitude of 40 degrees is about 0.010000°. According to an embodiment of the present invention, the transmission device 101 may express a maximum communication radius by bits in consideration of the number of bits for expressing the part of "10000" in 0.010000°. With respect to the part "10000", $2^{13}(=8192)<10000<2^{14}(=16384)$, so 14 bits (because $10000<2^{14}$) are required in order to express "10000" in bits using a binary number. Accordingly, the transmission device 101 according to an embodiment of the present invention may transmit 28 bits generated by adding the latitude (14 bits) and the longitude (14 bits) instead of transmitting 64 bits (32 bits+32 bits) required for existing latitude (32 bits) and longitude (32 bits) transmission.

In step 202, the transmission device 101 transmits the generated partial location information. The transmission device 101 may transmit partial location information based on a Least Significant Bit (LSB) corresponding to the predetermined number of bits in the current location information of the transmission device 101 based on the number of bits determined as described above. According to an embodiment of the present invention, the transmission device 101 may transmit only some pieces of the location information 740 and 840 of FIGS. 7 and 8.

Figure 3A:
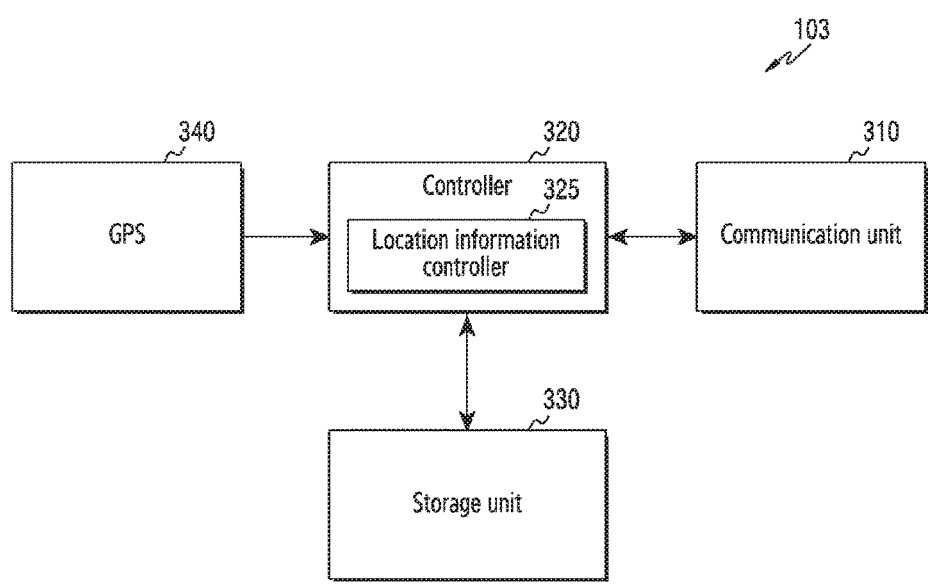
FIG. 3A is a block diagram illustrating a reception device for controlling location information according to an embodiment of the present invention.

FIG. 3A is a block diagram illustrating the reception device 103 for controlling location information according to an embodiment of the present invention.

Referring to FIG. 3A, the device includes a communication unit 310, a controller 320, a storage unit 330, and a GPS receiver 340.

The communication unit 310 performs a function for transmitting and receiving a signal through a wireless channel, such as band conversion and amplification of a signal. For example, the communication unit 310 may include a transmission filter, a reception filter, an amplifier, a mixer, an oscillator, a Digital-to-Analog Converter (DAC), an Analog-to-Digital Converter (ADC), and the like. The communication unit 110 may be referred to as a transmitter, a receiver, a transceiver, or a communication unit.

The controller 320 controls the overall operation of a device for controlling location information. The controller 320 includes a location information controller 325. The location information controller 325 controls, for example, the device for controlling the location information in order to perform the procedure illustrated in FIG. 3B. According to an embodiment of the present invention, the operation of the controller 320 is described below.

The controller 320 may convert partial location information received from the transmission device 101. Some pieces of the received location information include partial location information based on the LSB of the transmission device 101. The controller may generate new location information by replacing some pieces of the location information. The controller may generate new location information by combining the received partial location information based on the LSB of the transmission device 101 and the current location information of the reception device 103. The controller may correct the new location information. The controller identifies whether the new location information is within a range of a preset radius value of the current location of the reception device 103. When the new location information exceeds a maximum radius range of the electronic device, the controller may perform borrowing of a particular bit of the new location information. When the new location information is within a minimum radius range of the electronic device, the controller may perform carrying of a particular bit of the new location information.

The storage unit 330 may store values required by the device for controlling the location information. According to an embodiment of the present invention, the storage unit 330 may store the location information acquired from the GSP receiver 340. Further, the storage unit 330 may store a value of the location information newly generated by changing some bits of the electronic device into the received partial location information. In addition, the storage unit 330 may store a value generated by correcting the value of the newly generated location information to the value within the radius range.

The GPS receiver 340 may receive location information.

Figure 3B:
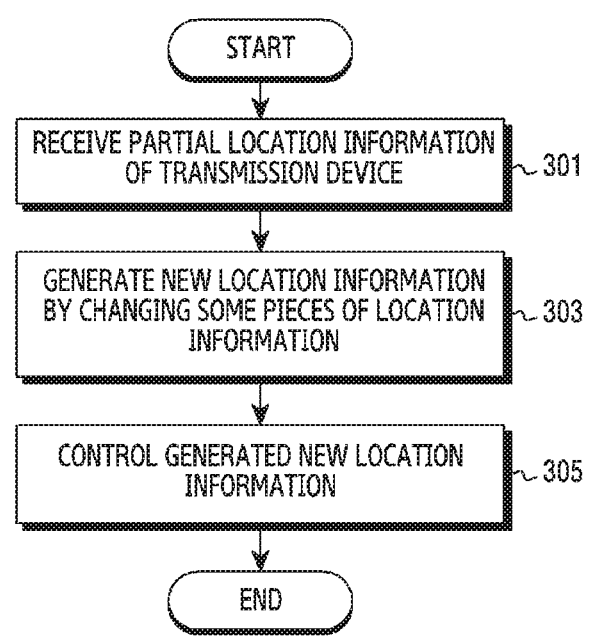
FIG. 3B is a flowchart illustrating the operation of a reception device for controlling location information according to an embodiment of the present invention.

FIG. 3B is a flowchart illustrating the operation of the reception device 103 for controlling location information according to an embodiment of the present invention.

Referring to FIG. 3B, the reception device 103 for controlling the location information receives some pieces of the location information from the transmission device 101 in step 301. The some pieces of the received location information include partial location information based on the LSB of the transmission device 101.

In step 303, the reception device 103 generates new location information by replacing some pieces of the location information. The reception device 103 may generate new location information by combining partial location information based on the LSB of the transmission device 101 received in step 301 and current location information of the reception device 103.

In step 305, the reception device 103 corrects the new location information. The reception device 103 identifies whether the new location information corresponds to a value within a preset radius range of the current location of the reception device 103. When the new location information is exceeds a maximum radius range of the reception device 103, the reception device 103 may perform borrowing of a particular bit of the new location information. When the new location information is within a minimum radius range of the reception device 103, the reception device 103 may perform carrying of a particular bit of the new location information.

Figure 3C:
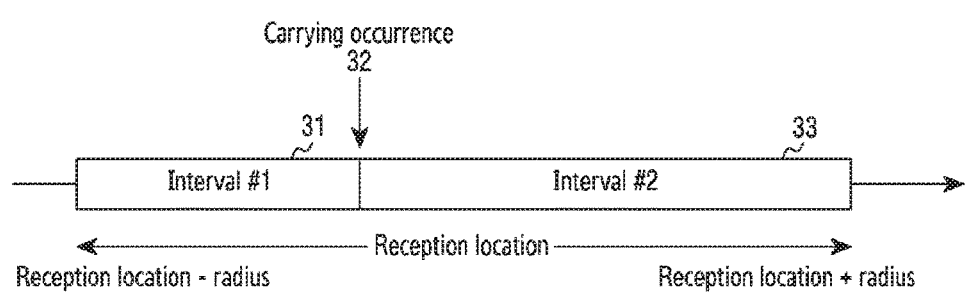
FIGS. 3C to 3D illustrate the control operation of a reception device for controlling location information according to an embodiment of the present invention.
Figure 3D:
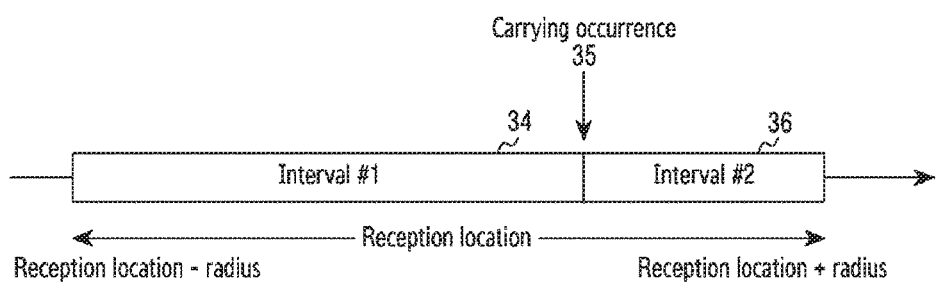

FIGS. 3C to 3D illustrate the control operation of the reception device for controlling location information according to an embodiment of the present invention.

The method by which the reception device 103 corrects the new location information in step 305 of FIG. 3B may be based on the current location of the reception device 103. The reception device 103 according to an embodiment of the present invention may perform the correction since the number of pieces of information that can be expressed using the partial location information received from the transmission device 101 is larger than number of pieces of information that can be expressed within the maximum radius range based on the reception device 103.

When the reception device 103 performs the correction, the reception device 103 may perform the correction according to the following reference.

The reference may be set using the current location information of the reception device 103 and carrying occurrence location information 32 illustrated in FIGS. 3C to 3D. The carrying occurrence location information 32 may be a value corresponding to a position at which a number in a preset place is changed when values are listed from a value generated by subtracting the radius from the reception location based on the current location of the reception device 103 to a value generated by adding the radius to the reception location based on the current location.

The number in the preset place may be a number corresponding to a number of bits that is higher than the number of bits of the radius by 1. For example, when the radius is k bits, the number in the preset place may be a number corresponding to K+1.

According to a first embodiment of the present invention, when there is no position at which the number in the preset place is changed when the values are listed from the value generated by subtracting the radius from the reception location based on the current location of the reception device 103 to the value generated by adding the radius to the reception location based on the current location, the reception device 103 may set the received new location information as location information of the transmission device 101.

FIG. 3C illustrates location information control of the reception device for controlling location information according to a second embodiment of the present invention.

Referring to FIG. 3C, an example of the case in which current location information of the reception device 103 is larger than the carrying occurrence information 32 is illustrated. When the transmission device 101 is located in interval #1 31, the reception device 103 may perform correction by borrowing the number set based on the value generated by adding the partial location information received from the transmission device 101, the partial location information on the LSB side of the transmission device 101, and the partial location information on the MSB side of the current location information of the reception device 103.

The carrying occurrence information 32 may be information on the occurrence of carrying from a $K^{th}$ bit to a $K+1^{th}$ bit. The $K^{th}$ bit refers to the most significant digit of the partial location information received from the first location information. Specifically, the carrying occurrence information 32 may be reference information on the position at which a $K+1^{th}$ number is changed.

For example, when it is assumed that the current location information of the reception device 103 is "100101" and a $K^{th}$ bit thereof is 3 bits, a radius range of the reception device 103 may be from "100001" to "101001". In this case, an interval in which a $K+1^{th}$ bit is changed within the radius range may be between "100111" and "101000". Interval #1 may range from "100001" to "100111", and interval #2 may range from "101000" to "1001001".

When the transmission device 101 is located in interval #2 33, the reception device 103 may set a value generated by adding the partial location information received from the transmission device 101, partial location information on the LSB side of the transmission device, and partial location information on the MSB side of the current location information of the reception device 103 as the current location information of the transmission device 101.

Interval #1 31 may refer to an interval including pieces of information having a size smaller than the carrying occurrence information 32, and interval #2 33 may refer to an interval including pieces of information having a size larger than the carrying occurrence information 32.

FIG. 3D illustrates location information control of the reception device for controlling the location information according to a third embodiment of the present invention.

Referring to FIG. 3D, an example of the case in which current location information of the reception device 103 is smaller than carrying occurrence information 35 is shown. When the transmission device 101 is located in interval #1 34, the reception device 103 may set a value generated by adding partial location information received from the transmission device 101, partial location information on the LSB side of the transmission device 101, and partial location information on the MSB side of the current location information of the reception device 103 as the current location of the transmission device 101.

The carrying occurrence information 35 may be information on the occurrence of carrying from a $K^{th}$ bit to a $K+1^{th}$ bit. The $K^{th}$ bit refers to the most significant digit of the partial location information received from the first location information. Specifically, the carrying occurrence information 35 may be reference information on the position at which a $K+1^{th}$ number is changed.

For example, when it is assumed that the current location information of the reception device 103 is "100101" and a $K^{th}$ bit thereof is 3 bits, a radius range of the reception device 103 may be from "100001" to "101001". In this case, an interval in which a $K+1^{th}$ bit is changed within the radius range may be between "100111" and "101000". Interval #1 may range from "100001" to "100111", and interval #2 may range from "101000" to "1001001".

When the transmission device 101 is located in interval #2 36, the reception device 103 may perform correction by carrying the number set based on the value generated by adding the partial location information received from the transmission device 101, the partial location information on the LSB side of the transmission device 101, and the partial location information on the MSB side of the current location information of the reception device 103.

Interval #1 34 may refer to an interval including pieces of information smaller than the carrying occurrence information 35, and interval #2 36 may refer to an interval including pieces of information the same size or larger than the carrying occurrence information 35.

Figure 4:
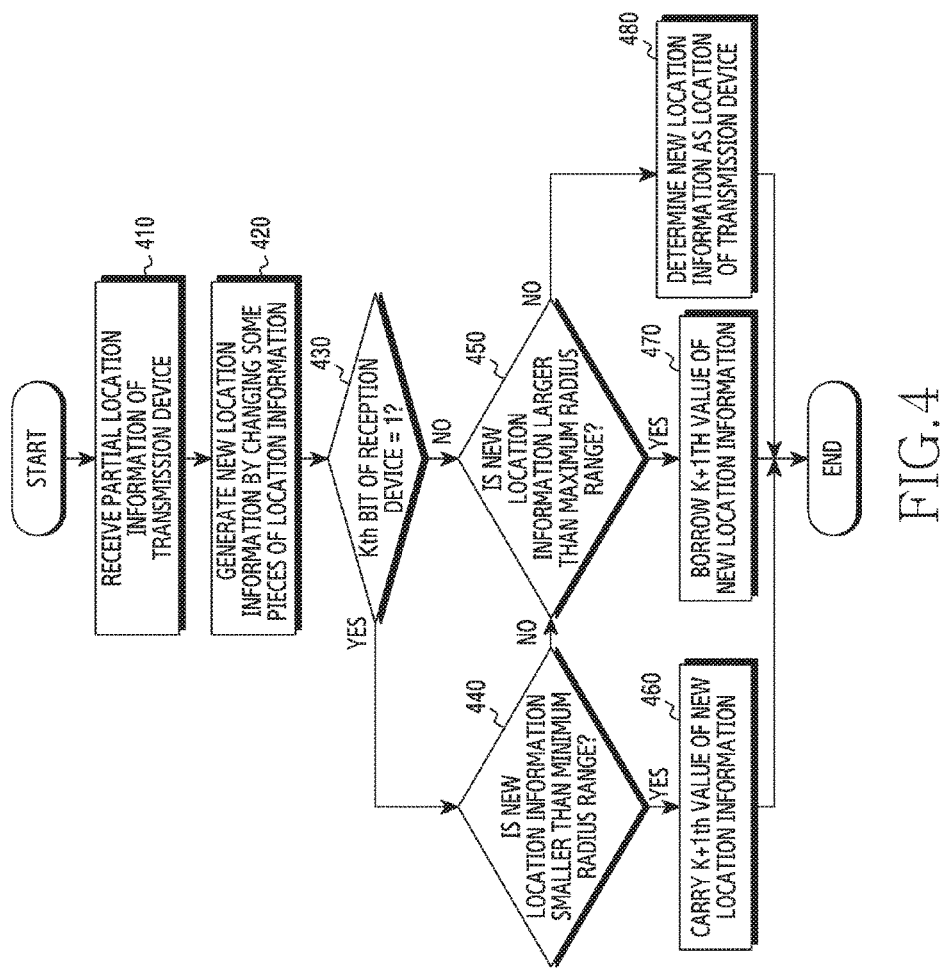
FIG. 4 is a flowchart illustrating a process of controlling generated location information according to an embodiment of the present invention.

FIG. 4 is a flowchart illustrating a process of controlling generated location information according to an embodiment of the present invention.

Referring to FIG. 4, the reception device 103 for controlling the location information receives partial location information from the transmission device 101 in step 410 (hereinafter, the received partial location information is referred to as "first location information").

The reception device 103 generates new location information through the first location information in step 420 (hereinafter, the generated new location information is referred to as second location information). The second location information may be generated using the current location information of the reception device 103 and the first location information. According to an embodiment, the reception device 103 may generate the second location information by adding the current location information of the reception device 103 and the received first location information. Specifically, the reception device 103 may generate the second location information by replacing some pieces of information expressed in bits in the current location information of the reception device 103 with the received first location information. Some pieces of information expressed in bits correspond to the number of bits of the first location information based on a Least Significant Bit (LSB).

In step 430, the reception device 103 identifies a $K^{th}$ bit of the current location of the reception device 103. The $K^{th}$ bit refers to a number corresponding to the most significant digit of the partial location information received from the first location information. For example, when a signal "100" is received from the transmission device 101, the received signal corresponds to 3 bits. Accordingly, the reception device 103 may identify that a number corresponding to a third bit from the LSB of the current location information of the reception device 103 is a $K^{th}$ bit. The identification of the $K^{th}$ bit serves to identify whether the generated second location information exists within the range of the reception device 103.

When the $K_{th}$ bit of the current location information is 1 in step 430, the reception device 103 identifies whether the generated second location information exists within the radius range in step 440. Specifically, the reception device 103 compares the value of the location information corresponding to a minimum radius range based on the current location of the reception device 103 with the size of the generated second location information. When the size of the second location information is smaller than the size of the value corresponding to the minimum radius range, the reception device 103 carries the $K+1^{th}$ bit of the second location information in step 460.

When the $K^{th}$ bit of the current location information is not 1 in step 430 or when the size of the value of the second location information is not smaller than the size of the value corresponding to the minimum radius range in step 440, the reception device 103 compares the size of the value of the second location information with the size of the value of the location information corresponding to a maximum radius range based on the current location information reception device 103 in step 450. When the size of the value of the second location information is larger than the size of the value corresponding to the maximum radius range, the reception device 103 borrows the $K+1^{th}$ bit of the second location information in step 470.

When the size of the value of the second location information is not larger than the size of the value of the location information corresponding to the maximum radius range based on the comparison between the size of the value of the second location information and the size of the value of the location information corresponding to the maximum radius range in step 450, the reception device 103 determines the value of the second location information as the location information of the transmission device 101 in step 480.

By carrying or borrowing the $K^{th}$ bit of the second location information or using the value of the second location information without any change, the reception device 103 may identify the original location information including the first location information of the electronic device that transmitted the first location information.

Figure 5:
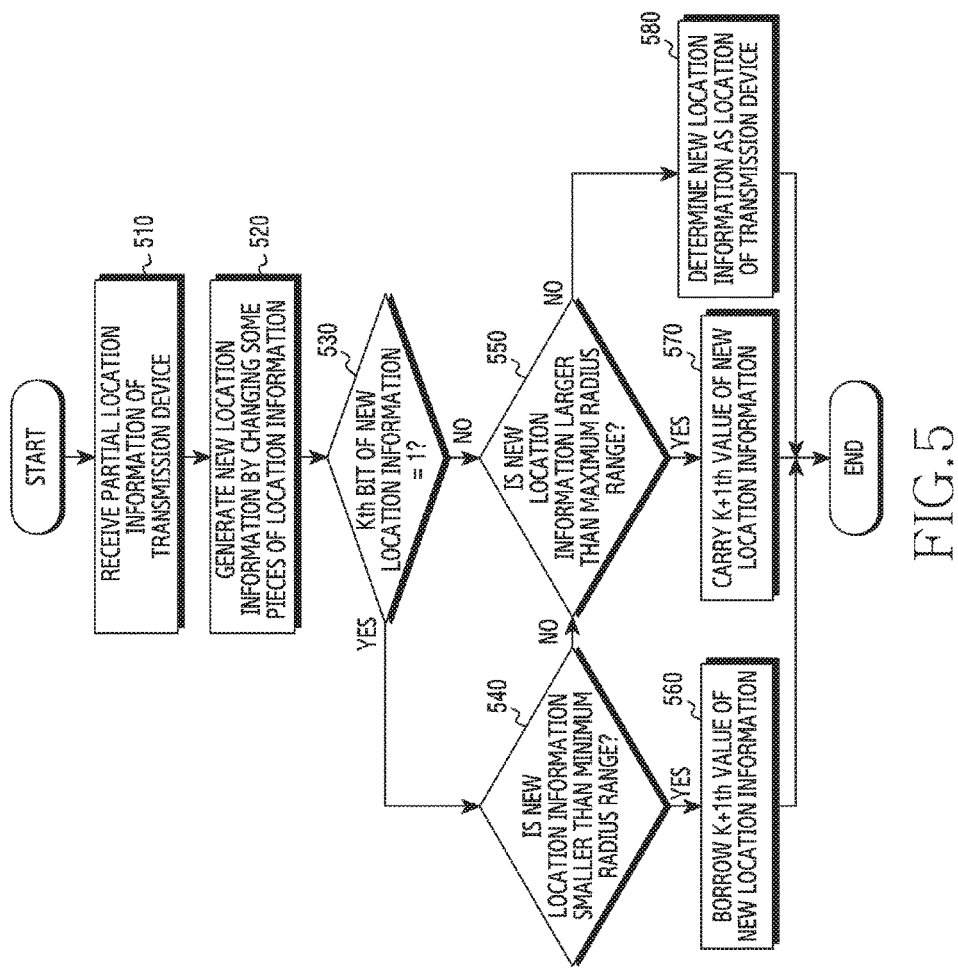
FIG. 5 is a flowchart illustrating the process of controlling generated location information according to another embodiment of the present invention.

FIG. 5 is a flowchart illustrating the process of controlling generated location information according to another embodiment of the present invention.

Referring to FIG. 5, the reception device 103 for controlling the location information receives partial location information of the transmission device 101 (hereinafter, the received partial location information is referred to as "first location information") in step 510.

The reception device 103 generates new location information through the first location information in step 520 (hereinafter, the new location information is referred to as "second location information"). The second location information may be generated using the current location information of the reception device 103 and the first location information. According to an embodiment, the reception device 103 may generate the second location information by summing the current location information of the reception device 103 and the received first location information. Specifically, the reception device 103 may generate the second location information by replacing some pieces of information expressed in bits in the current location information of the reception device 103 with the received first location information. The some pieces of information expressed in bits correspond in size to the number of bits of the first location information from the LSB.

In step 530, the reception device 103 identifies a $K^{th}$ bit of the current location of the reception device 103. The $K^{th}$ bit refers to a number corresponding to the most significant digit of the partial location information received from the first location information. For example, when a signal of "100" is received from the transmission device, the received signal corresponds to 3 bits. Accordingly, the reception device 103 may identify that a number corresponding to a third bit from the LSB of the current location information of the reception device 103 is the $K^{th}$ bit. The identification of the $K^{th}$ bit serves to identify whether the generated second location information exists within the range of the reception device 103.

When the $K^{th}$ bit of the second location information is 1 in step 530, the reception device 103 identifies whether the generated second location information exists within the radius range in step 540. Specifically, the reception device 103 compares the value of the location information corresponding to a minimum radius range based on the current location of the reception device with the size of a value of the second location information. When the size of the value of the second location information is smaller than the size of the value corresponding to the minimum radius range, the reception device 103 borrows the $K+1^{th}$ bit of the second location information in step 560.

When the $K^{th}$ bit of the second location information is not 1 in step 530 or when the size of the value of the second location information is not smaller than the size of the value corresponding to the minimum radius range in step 540, the reception device 103 compares the size of the value of the second location information with the size of the value of the location information corresponding to the minimum radius range based on the current location of the reception device in step 550. When the size of the value of the second location information is larger than the size of a value corresponding to a maximum radius range, the reception device 103 carries the $K+1^{th}$ bit of the second location information in step 570.

When the size of the value of the second location information is not larger than the size of the value of the location information corresponding to the maximum radius range based on the comparison between the size of the value of the second location information and the size of the value of the location information corresponding to the maximum radius range in step 550, the reception device 103 determines the value of the second location information as the location information of the transmission device 101 in step 580.

By carrying or borrowing the $K^{th}$ bit of the second location information or using the value of the second location information without any change, the reception device 103 may identify the original location information including the first location information of the electronic device that transmitted the first location information.

Figure 6:
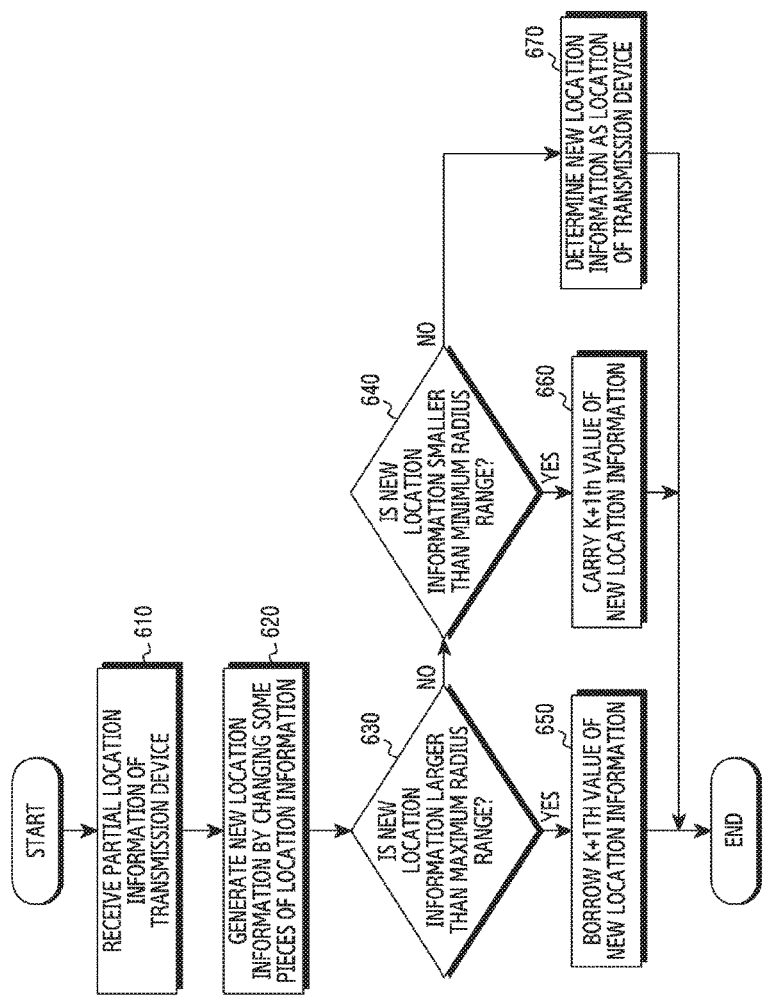
FIG. 6 is a flowchart illustrating the process of controlling generated location information according to still another embodiment of the present invention.

FIG. 6 is a flowchart illustrating the process of controlling generated location information according to still another embodiment of the present invention.

The reception device 103 for controlling the location information may identify location information of the transmission device 101 without identifying a $K^{th}$ bit of the current location information of the reception device or newly generated location information.

Referring to FIG. 6, the reception device 103 for controlling the location information receives partial location information of the transmission device 101 in step 610 (hereinafter, the received partial location information is referred to as first location information).

The reception device 103 generates new location information through the first location information in step 620 (hereinafter, the generated new location information is referred to as second location information). The second location information may be generated using the current location information of the reception device 103 and the first location information. According to an embodiment, the reception device 103 may generate the second location information by summing the current location information of the reception device 103 and the received first location information. Specifically, the reception device 103 may generate the second location information by replacing some pieces of information expressed in bits in the current location information of the reception device 103 with the received first location information. The some pieces of information expressed in bits correspond to the number of bits of the first location information from the LSB.

In step 630, the reception device 103 identifies whether the second location information exists within a radius range. Specifically, the reception device 103 compares a value of location information corresponding to a maximum radius range with the size of a value of the generated second location based on the current location of the reception device. When the size of the value of the second location information is larger than the size of the value corresponding to the maximum radius range, the reception device 103 borrows the $K+1^{th}$ bit of the second location information in step 650.

When the size of the value of the second location information is not larger than the size of the value corresponding to the minimum radius range in step 630, the reception device 103 compares the size of the value of the second location information with the size of the value of the location information corresponding to the minimum radius range based on the current location of the reception device in step 640. When the size of the value of the second location information is smaller than the size of the value corresponding to the minimum radius range, the reception device 103 carries the $K+1^{th}$ bit of the second location information in step 660.

When the size of the value of the second location information is not smaller than the size of the value of the location information corresponding to the minimum radius range based on the comparison between the size of the value of the second location information and the size of the value of the location information corresponding to the minimum radius range in step 640, the reception device 103 determines the value of the second location information as the location information of the transmission device 101 in step 670.

By carrying or borrowing the $K^{th}$ bit of the second location information or using the value of the second location information without any change, the reception device 103 may identify the original location information including the first location information of the electronic device that transmitted the first location information.

Figure 7:
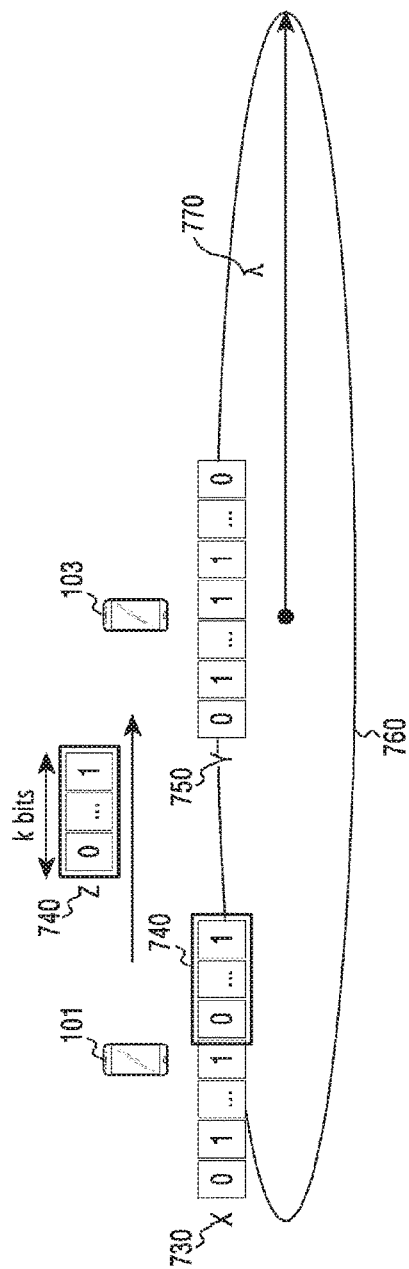
FIG. 7 illustrates an example of location information control according to an embodiment of the present invention.

FIG. 7 illustrates an example of location information control according to an embodiment of the present invention.

Referring to FIG. 7, the transmission device 101 transmits partial location information Z 740 of current location information X 730 of the transmission device 101 to the reception device 103. At this time, the partial location information Z 740 corresponds to a preset radius value λ 770 based on location information Y 750 of the reception device 103. According to an embodiment of the present invention, it is assumed that the transmission device 101 is located within a range 760 corresponding to the radius value λ 770 from the reception device 103.

The transmission device 101 transmits some lower bits of the current location information X 730 to transmit the partial location information Z 740. At this time, the some lower bits have a size corresponding to the radius value λ 770. According to an embodiment of the present invention, the size corresponding to the radius value may be set in consideration of the strength of a signal that the transmission device 101 can transmit in a system in which the transmission device 101 operates. Further, the maximum communication radius may be set in consideration of a predetermined margin of the considered signal strength. For helping in understanding of the description of FIG. 7, the case in which a value of the size of radius value λ 770 is a $K^{th}$ bit will be described. When it is assumed that the current location X 730 of the transmission device 101 is "01 . . . 10 . . . 1", the transmission device 101 transmits the value Z 740 corresponding to the $K^{th}$ bit from the LSB of the current location X 730 to the reception device 103.

The reception device 103 receiving the partial location information Z 740 from the transmission device 101 combines the location information Y 750 of the reception device 103 and the received partial location information Z 740. Specifically, the reception device 103 generates new second location information by changing the $K^{th}$ bit of the reception device 103 into the received partial location information Z 740. For example, in FIG. 7, the second location information becomes "01 . . . 10 . . . 1", in which numbers "0 . . . 1" up to the $K^{th}$ bit from the LSB are changed from "01 . . . 11 . . . 0". Thereafter, the reception device 103 identifies whether the generated second location information is within the radius range 760 from the reception device 103. When the generated second location information is not within the radius range 760, the reception device 103 reconstructs the location of the transmission device 101 by carrying or borrowing the $K+1^{th}$ value of the second location information. Specifically, when the size of the generated second location information is larger than the value generated by adding the current location information Y 750 of the reception device 103 and the radius value 770, that is, the size of the maximum radius value, the reception device 103 borrows the $K+1^{th}$ value of the second location information. When the size of the generated second location information is smaller than the value generated by subtracting the radius value 770 from the current location information 750 of the reception device 103, that is, the size of the minimum radius value, the reception device 103 carries the $K+1^{th}$ value of the second location information.

Figure 8:
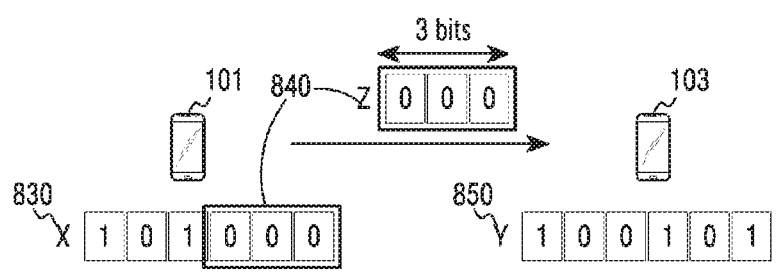
FIG. 8 illustrates an example of location information control according to another embodiment of the present invention.

FIG. 8 illustrates an example of location information control according to another embodiment of the present invention.

Referring to FIG. 8, the transmission device 101 transmits partial location information Z 840 of current location information X 830 of the transmission device 101 to the reception device 103.

The transmission device 101 transmits some lower bits of the current location information X 830 to transmit the partial location information Z 840. For helping in understanding of the description of FIG. 9, an example of the case in which the size of the radius value is 3 bits will be described. When the current location X 830 of the transmission device 101 is "101000", the transmission device 101 transmits the value Z 840 corresponding to 3 bits of "000" in the current location information X 830 to the reception device 103.

The reception device 103 receiving the partial location information Z 840 from the transmission device 101 combines the location information Y 850 of the reception device 103 with the received partial location information Z 840. Specifically, the reception device 103 generates new second location information by changing lower 3 bits of the reception device 103 to the received partial location information Z 840. For example, in FIG. 8, the second location information becomes "100000", in which numbers up to the $K^{th}$ bit "000" from the LSB are changed from "100101". Thereafter, the reception device 103 identifies whether the generated second location information is within the radius based on the reception device 103. When the generated second location information is not within the radius range, the reception device 103 reconstructs the location of the transmission device 101 by carrying or borrowing a fourth bit from the LSB of the second location information. Specifically, when the size of the generated second location information is larger than the value generated by adding the current location information Y 850 of the reception device 103 and the radius value, that is, the size of the maximum radius value, the reception device 103 borrows the fourth bit from the LSB of the second location information. Specifically, for example, the size of the maximum radius in the current location information of the reception device 103 is "101001", which is a value generated by adding "100101" and numbers "100" up to a third bit from the LSB, and the size of the minimum radius is "100001", which is a value generated by subtracting the numbers "100" up to the third bit from the LSB from "100101" in FIG. 8. In FIG. 8, since the size of the value of the generated second location information is "100000", which is smaller than the size of the maximum radius of "100101" and smaller than the size of the minimum radius of "100001", the reception device 103 carries the fourth value of the second location information from the LSB. Accordingly, the second location information becomes "101000". As a result, the reception device 103 may reconstruct the current location information X 830 of the transmission device 101 through the partial location information Z 840 received from the transmission device 101 through the above process.

When the size of the generated second location information is smaller than the value generated by subtracting the radius value from the current location information Y 850 of the reception device 103, that is, the size of the minimum radius value, the reception device 103 carries the $K+1^{th}$ value of the second location information.

Figure 9:
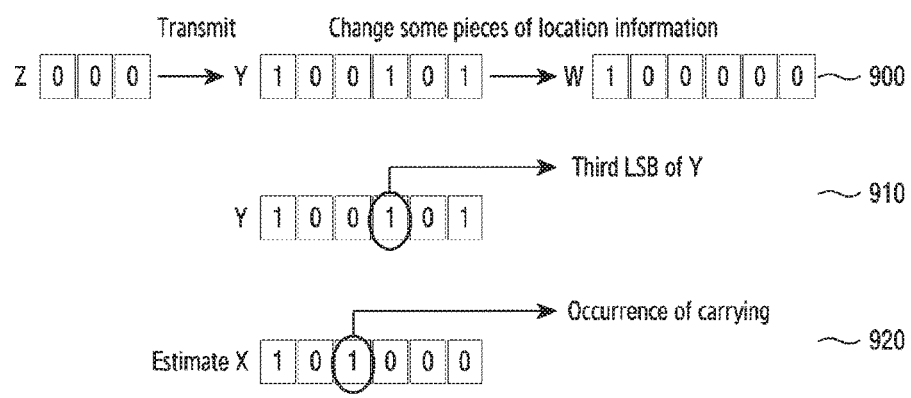
FIG. 9 illustrates an example of location information control according to still another embodiment of the present invention.

FIG. 9 illustrates an example of location information control according to still another embodiment of the present invention.

Referring to FIG. 9, when partial location information Z transmitted from the transmission device is received by the reception device, the reception device 103 generates new location information W by replacing some pieces of the current location information of the reception device 103 in step 900. For example, in FIG. 9, the reception device 103 changes numbers up to a third bit from the LSB in the location information "100101" of the reception device 103 into partial information "000" received from the transmission device. Accordingly, generated new location information becomes "100000".

In step 910, the reception device 103 may determine whether to perform carrying. The reception device 103 identifies whether a bit value in a place corresponding to the number of bits of the partial location information Z in the current location information of the reception device 103 is "1". When the bit value in the corresponding place is "1", the reception device 103 performs carrying in the generated new location information W.

In step 920, the reception device 103 performs carrying in the generated new location information W. Specifically, the reception device 103 carries a fourth bit from the LSB in the generated new location information W. By performing the carrying in the generated new location information W, the reception device 103 may correct the generated new location information W to a value within the radius range of the current location information Y of the reception device 103.

Figure 10:
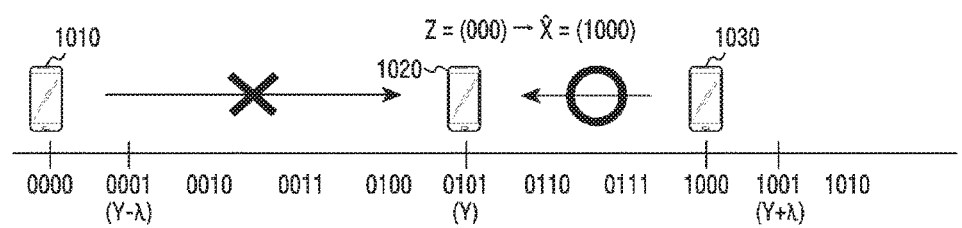
FIG. 10 illustrates an example of location information control based on a distance between a reception device and a transmission device according to an embodiment of the present invention.

FIG. 10 illustrates an example of location information control according to a distance between the reception device and the transmission device according to an embodiment of the present invention.

Referring to FIG. 10, when the transmission device transmits partial location information to the reception device, the reception device may identify whether the partial location information transmitted from the transmission device is within a radius range of the reception device. In FIG. 10, when it is assumed that the radius range of the reception device is within 3 bits based on the reception device 1020, the radius range of the reception device 1020 corresponds to the range from "−100" bits to "+100" bits based on "0101". That is, the radius range of the reception device 1020 may be from "0001" (Y−λ) to "1001" (Y+λ). The reception device 1020 receives the partial location information from the transmission device and combines the partial location information and the current location information of the reception device 1020 so as to generate new location information. The reception device 1020 identifies whether the generated location information is within the radius range.

Specifically, for example, in FIG. 10, when the location of the reception device 1020 is "0101" and the partial location information received from the transmission device is "000", the reception device generates new location information "0000" by combining the current location and the partial location information. Thereafter, the reception device identifies whether the generated new location information is within the radius range of the current location information of the reception device 1020. That is, the reception device identifies whether the generated location information "0000" falls within the range from "0001" to "1001". In FIG. 10, the generated new location information is "0000". Accordingly, if the transmission device 1010 is located at the value of "0000", it does not fall within the radius range, and thus correction is needed. "0000" corresponds to a value smaller than "0001", so the reception device 1020 carries a first value of the generated location information. That is, "0000" is corrected to "1000". Accordingly, the reception device 1020 may identify that the location of the transmission device 1030 corresponds to the location of "1000".

Figure 11:
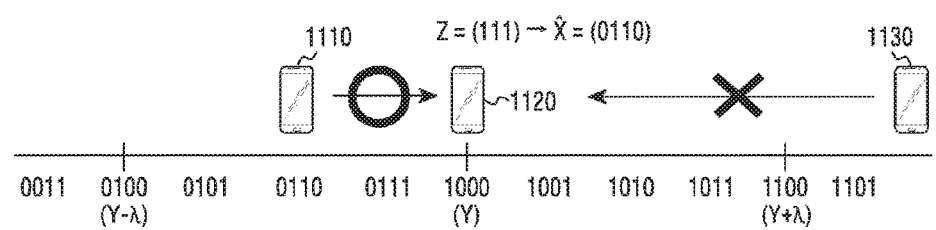
FIG. 11 illustrates an example of location information control based on a distance between a reception device and a transmission device according to another embodiment of the present invention.

FIG. 11 illustrates an example of location information control according to the distance between the reception device and the transmission device according to another embodiment of the present invention.

When it is assumed that the radius range of the reception device 103 is within 3 bits based on the reception device 1120 in FIG. 11, the radius range of the reception device 1120 corresponds to the range from "−100" bits to "+100" bits based on "1000". That is, the radius range of the reception device 1120 may be from "0100" (Y−λ) to "1100" (Y+λ).

For example, in FIG. 11, when the location of the reception device 1120 is "1000" and partial location information received from the transmission device is "110", the reception device generates new location information "1110" by combining the current location and the partial location information. Thereafter, the reception device identifies whether the generated new location information is within the radius range of the current location information of the reception device 1120. That is, the reception device identifies whether the generated location information "1110" falls within the range from "0100" to "1100". In the example of FIG. 11, the generated new location information is "1110". Accordingly, if the transmission device 1130 is located at the value of "1110", it does not fall within the radius range, and thus correction is needed. Since "1110" corresponds to a value larger than "1100", the reception device 1120 borrows a first value of the generated location information. That is, "1110" is corrected to "0110". Accordingly, the reception device 1120 may identify the location of the transmission device 1110 corresponding to the location "0110".

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present invention, a component included in the present invention is expressed in the singular or the plural according to a presented detailed embodiment. However, the singular or plural expressions are selected to be suitable for proposed situations for convenience of description, and the present invention is not limited to the singular or plural elements. An element expressed in a plural form may be configured in singular, or an element expressed in a singular form may be configured in plural.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

The invention claimed is:

1. A method for determining a location information of a transmission device by an electronic device, the method comprising:
   receiving a first location information including a partial location information of the transmission device from the transmission device;
   generating a second location information based on the partial location information of the transmission device and a location information of the electronic device;
   updating the second location information based on an information on a communication available range of the electronic device; and
   determining the location information of the transmission device based on the updated second location information,
   wherein the location information is expressed by a plurality of bits, the partial location information is expressed by at least one least significant bits of the plurality of bits, and a number of the at least one least significant bits is determined based on a number of bits for the information on the communication available range of the electronic device.

2. The method of claim 1, wherein the information on the communication available range includes a information on at least one of a communication available signal strength of the electronic device and a communication available signal radius of the electronic device.

3. The method of claim 1, wherein location information includes a first part and a second part, and
   wherein the generating of the second location information comprises:
      the first part of the second location information includes the first part of the location information of the electronic device, and
      the second part of the second location information includes the partial location information.

4. The method of claim 1, wherein the generating of the second location information comprises:
   replacing the plurality of bits of the second location information with the plurality of bits of the location information of the electronic device; and
   replacing a number of least significant bits (K LSBs) of the second location information with K bits of the partial location information.

5. The method of claim 4, wherein the updating of the second location information comprises:
   setting a $(K+1)^{th}$ bit of the generated second location information to 1 in case that a $K^{th}$ bit of the location information of the electronic device is 1.

6. The method of claim 4, wherein the updating of the second location information comprises updating the second location information based on a value of the location information of the electronic device and a value of the information on the communication available range of the electronic device.

7. The method of claim 6, wherein the updating of the second location information comprises:
   setting a (K+1)th bit of the generated second location information to 1 in case that a value of the generated second location information is smaller than a minimum radius range of the electronic device, wherein the minimum radius range is determined by a value generated by subtracting the value of the information on the communication available range of the electronic device from the value of the location information of the electronic device.

8. The method of claim 6, wherein the updating of the second location information comprises:
   setting a (K+1)th bit of the generated second location information to 0 in case that a value of the generated second location information is larger than a maximum radius range of the electronic device, wherein the maximum radius range is determined by a value generated by adding the value of the location information of the electronic device and the value of the information on the communication available range of the electronic device.

9. An electronic device for determining a location information of a transmission device comprising:
   a transceiver configured to communicate with the transmission device; and
   a controller functionally connected to the transceiver,
   wherein the controller is configured to:
      receive a first location information including a partial location information of the transmission device from the transmission device,
      generate a second location information based on the partial location information of the transmission device and a location information of the electronic device,
      compensate the second location information based on an information on a communication available range of the electronic device, and
      determine the location information of the transmission device based on the updated second location information,
      wherein the location information is expressed by a plurality of bits, the partial location information is expressed by at least one least significant bits of the plurality of bits, and a number of the at least one least significant bits is determined based on a number of bits for the information on the communication available range of the electronic device.

10. The electronic device of claim 9, wherein the information on the communication available range includes a information on at least one of a communication available signal strength of the electronic device and a communication available signal radius of the electronic device.

11. The electronic device of claim 9,
    wherein location information includes a first part and a second part, and
    wherein the controller is further configured to generate the second location information by including the first part of the location information of the electronic device for the first part of the second location information and the partial location information for the second part of the second location information.

12. The electronic device of claim 9, wherein the controller is further configured to replace the plurality of bits of the second location information with the plurality of bits of the location information of the electronic device and replace a number of least significant bits (K LSBs) of the second location information with K bits of the partial location information.

13. The electronic device of claim 12, wherein the controller is further configured to compensate the second location information by setting a $(K+1)^{th}$ bit of the generated second location information to 1 in case that $K^{th}$ bit of the location information of the electronic device is 1.

14. The electronic device of claim 12, wherein the controller is further configured to compensate updating the second location information based on a value of the location information of the electronic device and a value of the information on the communication available range of the electronic device.

15. The electronic device of claim 14, wherein the controller is further configured to compensate the second location information by setting a $(K+1)^{th}$ bit of the generated second location information to 1 in case that a value of the generated second location information is smaller than a minimum radius range of the electronic device, wherein the minimum radius range is determined by a value generated by subtracting the value of the information on the communication available range of the electronic device from the value of the location information of the electronic device and setting a $(K+1)^{th}$ bit of the generated second location information to 0 in case that a value of the generated second location information is larger than a maximum radius range of the electronic device, wherein the maximum radius range is determined by a value generated by adding the value of the location information of the electronic device and the value of the information on the communication available range of the electronic device.

* * * * *